US010883881B2

(12) United States Patent
Hunka

(10) Patent No.: US 10,883,881 B2
(45) Date of Patent: Jan. 5, 2021

(54) METHOD FOR ENVIRONMENTAL ANALYSIS AND CONTROL OF SPATIAL AREAS

(71) Applicant: Robert Stephen Hunka, Oakland, CA (US)

(72) Inventor: Robert Stephen Hunka, Oakland, CA (US)

( * ) Notice: Subject to any disclaimer, the term of this patent is extended or adjusted under 35 U.S.C. 154(b) by 0 days.

(21) Appl. No.: 16/792,769

(22) Filed: Feb. 17, 2020

(65) Prior Publication Data

US 2020/0182699 A1 Jun. 11, 2020

Related U.S. Application Data

(63) Continuation-in-part of application No. 15/979,204, filed on May 14, 2018, now Pat. No. 10,619,881.

(51) Int. Cl.
*G01J 5/00* (2006.01)
(52) U.S. Cl.
CPC ..... *G01J 5/0037* (2013.01); *G01J 2005/0077* (2013.01); *G01J 2005/0085* (2013.01)
(58) Field of Classification Search
CPC ..... G04F 1/32; G04F 1/3203; G05D 23/1927; G05D 23/1928; G05D 23/193;
(Continued)

(56) References Cited

U.S. PATENT DOCUMENTS

| 5,291,748 A * | 3/1994 | Ueda .................. B60H 1/00742 236/78 D |
| 6,997,390 B2 * | 2/2006 | Alles ..................... F24F 3/0442 236/49.4 |

(Continued)

*Primary Examiner* — William V Gilbert

(57) ABSTRACT

The goal of the METHOD FOR ENVIRONMENTAL ANALYSIS AND CONTROL OF SPATIAL AREAS as a continuation of "The Spatial Environmental Control Unit" is a method of logging multi-spectral, multi-pixel infrared radiation data of objects in a spatial area for the analysis and control of heat transfer dynamics in the spatial area that is responsive to feedback for controlling the thermal conditions in the spatial area. The METHOD FOR ENVIRONMENTAL ANALYSIS AND CONTROL OF SPATIAL AREAS further makes the current norm of an "absolute" temperature control approach for thermal control and human comfort obsolete. Ambient environmental conditions and user preference variables makes the current approach to thermal control time consuming, inaccurate and tedious. The Spatial Environmental Control Unit as one of our foundation patents disclosed the physical components make thermal control and analysis more responsive and user friendly. The METHOD FOR ENVIRONMENTAL ANALYSIS AND CONTROL OF SPATIAL AREAS makes the control and analysis of the thermal properties of the spatial area more intuitive by providing visual images on any compatible device simplifying the understanding of the dynamics of heat transfer in an environment. Tedium and frustration become understanding and empowerment. This method enables gaining knowledge and using tools for analysis, allowing a user to "redesign" his environment by correcting ambient conditions and improving the operation of the thermal conditioning equipment. The end result is a better thermal environment with higher energy efficiency.

4 Claims, 8 Drawing Sheets

(58) Field of Classification Search
CPC ............ G05D 23/1931; G05D 23/1932; G01J 5/0037; G01J 2005/0077; G01J 2005/0085
USPC ........ 700/276, 277, 278, 299, 300; 165/253, 165/254; 236/1 B, 1 C; 454/239, 256; 234/44 C, 91 R, 91 D; 340/229
See application file for complete search history.

(56) References Cited

U.S. PATENT DOCUMENTS

| | | | | |
|---|---|---|---|---|
| 7,163,156 | B2* | 1/2007 | Kates | F24F 11/62 236/1 B |
| 7,468,504 | B2* | 12/2008 | Halvis | G01J 3/2823 250/226 |
| 8,033,479 | B2* | 10/2011 | Kates | G05D 23/1934 236/1 B |
| 8,630,742 | B1* | 1/2014 | Stefanski | H05B 1/028 700/278 |
| 8,788,097 | B2* | 7/2014 | Drees | G05B 23/00 700/275 |
| 2006/0234621 | A1* | 10/2006 | Desrochers | F24F 3/044 454/239 |
| 2010/0163633 | A1* | 7/2010 | Barrett | F24H 9/2064 236/49.3 |
| 2011/0198404 | A1* | 8/2011 | Dropmann | F24F 13/082 236/49.3 |
| 2012/0203380 | A1* | 8/2012 | Scelzi | G01K 17/20 700/276 |
| 2013/0092364 | A1* | 4/2013 | Kumar | B60H 1/00842 165/237 |

\* cited by examiner

METHOD FOR ENVIRONMENTAL ANALYSIS AND CONTROL OF SPATIAL AREAS

BACKGROUND OF THE INVENTION

From the early days of HVAC the focus for conditioning air for human comfort has been based on measuring temperature. From mercury thermometers to thermistors, thermocouples, RTDs, technology has advanced to refine the accuracy of temperature measurement as determined by the air temperature at a single point or averaged over an area in space. The drawbacks of a single temperature measurement in space is that the number is an absolute and fixed numerical measurement or calculation. It applies to point or a single average number within an area and is not "smart" enough to understand the variations in temperature distribution throughout the spatial area of interest and the variables in human perception of comfort in a timely fashion. The acceptability of thermal environmental level varies whether an individual wants conditions warmer or cooler than the current level. If controlling thermal comfort, individuals may prefer warmer temperatures indoors on cold days and cooler temperatures on warm days. Human biological cycles affect the hourly and daily perception of thermal comfort. Activity levels and clothing are also important factors. As energy considerations become more critical the ability to trade off clothing vs energy usage requires flexibility in convenient, timely and accurate control of thermal conditions. To satisfy the dynamic variables requires a "smarter" control of thermal conditions than the current state of the art. The proposed invention introduces the concept of relativity in thermal level refined by effectively responding to user comfort feedback.

OBJECTS AND ADVANTAGES OF THE INVENTION

The goal of the METHOD FOR ENVIRONMENTAL ANALYSIS AND CONTROL OF SPATIAL AREAS as a continuation based on the Spatial Environmental Control Unit (USPTO application Ser. No. 15/979,204) is to create a user friendly accurate analysis of heat transfer dynamics in one or more spatial areas that is responsive to the thermal dynamics of the area of interest and accurate to maintain an acceptable level of thermal control as environmental and biological human conditions change without requiring excessive interruptions to the user for manual adjustment. The method developed with the Spatial Environmental Control Unit (Ser. No. 15/979,204) makes the current norm of an "absolute" temperature control approach for thermal control and human comfort obsolete. A COMFORT "theory of relativity" will be the new norm. The proposed dynamic method of analyzing the thermal changes rapidly within the area of detection responds to the variable thermal changes in environment better than the best static or "learning" process currently available. Even though the current "learning" process for thermal control makes periodic changes based on logged user preferences as a function of time, it still controls for extended time periods with a single static temperature set point. Basically, a series of a series of static control sequences as a function of time. The proposed METHOD ENVIRONMENTAL FOR ANALYSIS AND CONTROL OF A SPATIAL AREA incorporates the dynamics of analyzing real time thermal changes with timely feedback from the user.

The IMPLEMENTATION is as follows:

The thermal heating or cooling capacity of any object in a space produces infrared energy that can be observed and measured by an infrared radiation detector. At least one multi-spectral multi-pixel infrared sensing detector measures infrared radiation of objects in at least one spatial area and communicates the infrared radiation data to an electronic control unit for analysis wherein each radiation sensing cell or pixel converts the thermal radiation from an object to a change in measurable electrical property (including, but not limited to, a photo-current, a resistance, a voltage) such that the property can be read, transmitted and stored for analysis. That electrical signal is representative of the radiation level and heating or cooling potential of any object on other objects in its line of sight. The resolution of the electrical signal map from the pixels within the array will allow determination of the nature of the thermal load and heat transfer between objects in the area of detection. The resolution is a function of the number of pixels and the ability of the lens to focus the radiation and the accuracy of the infrared radiation detecting pixels. The current "obsolete" state of art using infrared sensors in environment thermal control, at best, averages some or all of the electrical signals from the infrared pixels. This is better than a single point non-infrared temperature sensor or multiple temperature sensors because, with current infrared sensors, each pixel is a sensor that supports the averaging and subsequent post processing to determine a temperature that represents the average temperature of object in the area of detection. But this approach continues the "obsolete" approach of temperature as an single absolute measurement of thermal level. The proposed method looks at the spatial dynamics, in 2D and 3D, to better define the heat transfer between objects in the area of detection and the movement of the thermally conditioned fluid. Natural light visibility imaging, incorporated in the proposed method, enhances thermal analysis and facilitates bidirectional communication with the user. Additionally, the resolution of the infrared sensor (pixel count) and the capability to analyze changes in consecutive logged images allow tracking of the conditioned fluid movement within the area of detection based on the consecutive thermal infrared radiation signals used for communication to the electronic control unit. The tracked thermal movement is valuable feedback on the direction and flow rate of the conditioned fluid to determine the effectiveness of the METHOD FOR ENVIRONMENTAL ANALYSIS AND CONTROL OF SPATIAL AREAS.

Our method will employ a multi-pixel, multi-spectral infrared radiation sensor, a custom algorithm to map the thermal load distribution and the dynamic transfer of heat in the spatial area of interest. The most common applications would be the accurate and timely control of user human comfort in an office, room in a residential space or an outdoor spatial area. Ultra-low power sensing devices is incorporated for remote room temperature, supply air temperature, occupancy detection for control and security, and safety functions of fire and smoke detection.

The control method is as follows:

Position and mount an infrared sensor in a location that allows mapping infrared radiation in one or more spatial areas. (Optionally: Using internal angular adjustment capability, direct the infrared and adjust the focus for the required field of view to one or more spatial areas). Map the infrared radiation level from each pixel sensing radiation in one or more spatial areas. (Optionally: Prioritize the approximate location of the focus of interest to apply weighting factors and calculations for objects with the best starting point for determination of ambient thermal load dynamics that affect the thermal requirements.) The thermal load dynamics analysis include calculation of both convective heat transfer within one or more spatial areas and radiation heat transfer directly between objects in one or more spatial areas. Input the heating and cooling capability of the thermally conditioned fluid and location of the source of thermally conditioned fluid.

Thermal control at location of interest within a spatial area is a balance between the external ambient thermal load (BTU) and the thermally conditioned fluid flow (BTU) capabilities. Offsetting the ambient thermal load by adjusting the flow of thermally conditioned fluid allows control of spacial thermal level. The method is to develop the thermal map of one or more spatial areas for control which is updated periodically to monitor thermal changes. The method further allows for multiple infrared radiation sensors spaced to provide for development of a 3D space thermal map further improving analysis of the effects of convective heat transfer and radiation heat transfer based on location of objects within one or more spatial areas. The method further employs environmental visible light sensing for visual analysis of heat transfer between objects in one or more spatial areas and movement of thermally conditioned fluid in one or more spatial areas.

Proposed enhancements include the following:

The method employing aiming a pointing beam from the current location of interest in the spatial area for control that can be directed at the infrared sensor to pinpoint current control location.

The method employs an optical sensor for visible light detection that can be superimposed with the infrared image to create a more photo realistic viewing capability.

The method employs positioning an object with thin elements in the one or more spatial areas wherein each small segment of the individual thin elements warms or cools and stabilizes rapidly to represent the ambient gas thermal conditions in contact with it.

The method employing additional 3D distance mapping components to provide information about the spatial dimensions and size and location of objects within the area of detection. Technology for image capture for dimensional analysis could include, but not limited to, time of flight technology and "light coding technology". Determining dimensions for the physical position of objects in the field of view enhances the accuracy of calculations for heat transfer between objects.

Include a temperature sensor measuring the temperature of the thermally conditioned fluid flow in the one or more spatial areas to determine if the thermally conditioned fluid system for thermal control represents a heating, cooling- or recirculation mode and is in the proper thermal state to control the thermal conditions in one or more spatial areas.

BRIEF DESCRIPTION OF THE DRAWINGS

Taking the following specifications in conjunction with the accompanying drawings will cause the invention to be better understood regarding these and other features and advantages. The specifications reference the annexed drawings: wherein.

DETAILED DESCRIPTION OF THE PREFERRED EMBODIMENTS

While describing the invention and its embodiments, various terms will be used for the sake of clarity. These terms are intended to not only include the recited embodiments, but also all equivalents that perform substantially the same function, in substantially the same manner to achieve the same result.

Figure 1:
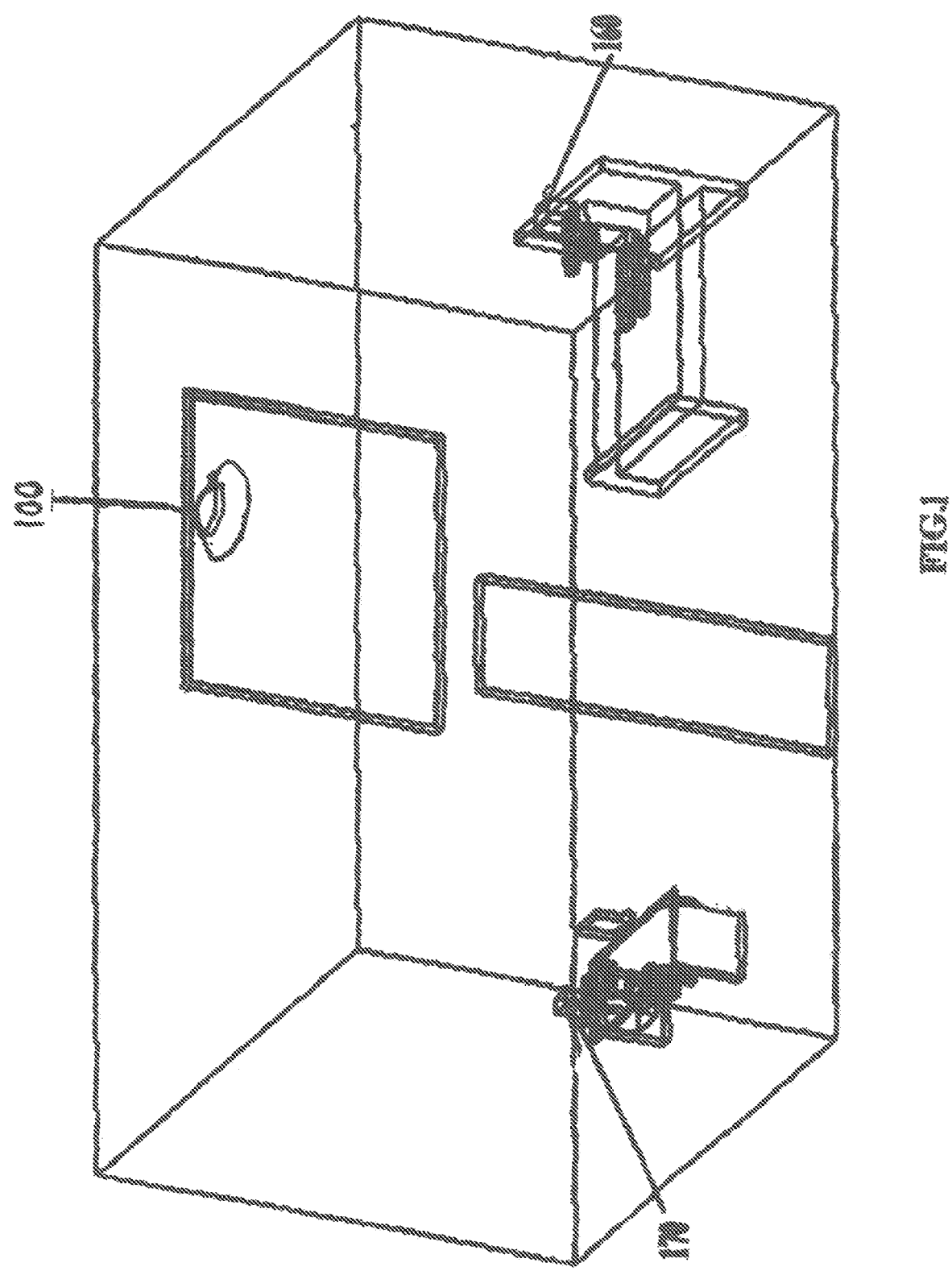
FIG. 1 is a perspective view of spatial areas of interest in a room for infrared radiation scanning from a ceiling location.

Now referring to FIG. 1 which discloses a preferred location for a multi-pixel, multi-spectral infrared radiation sensor, positioned in a housing for conditioned fluid flow passage, referenced by numeral 100 scanning infrared radiation in spatial areas. The entire room can be scanned as a single spatial area or sub-divided into smaller spatial areas. Spatial area locations are reference by numerals 160 and 170.

Figure 2:
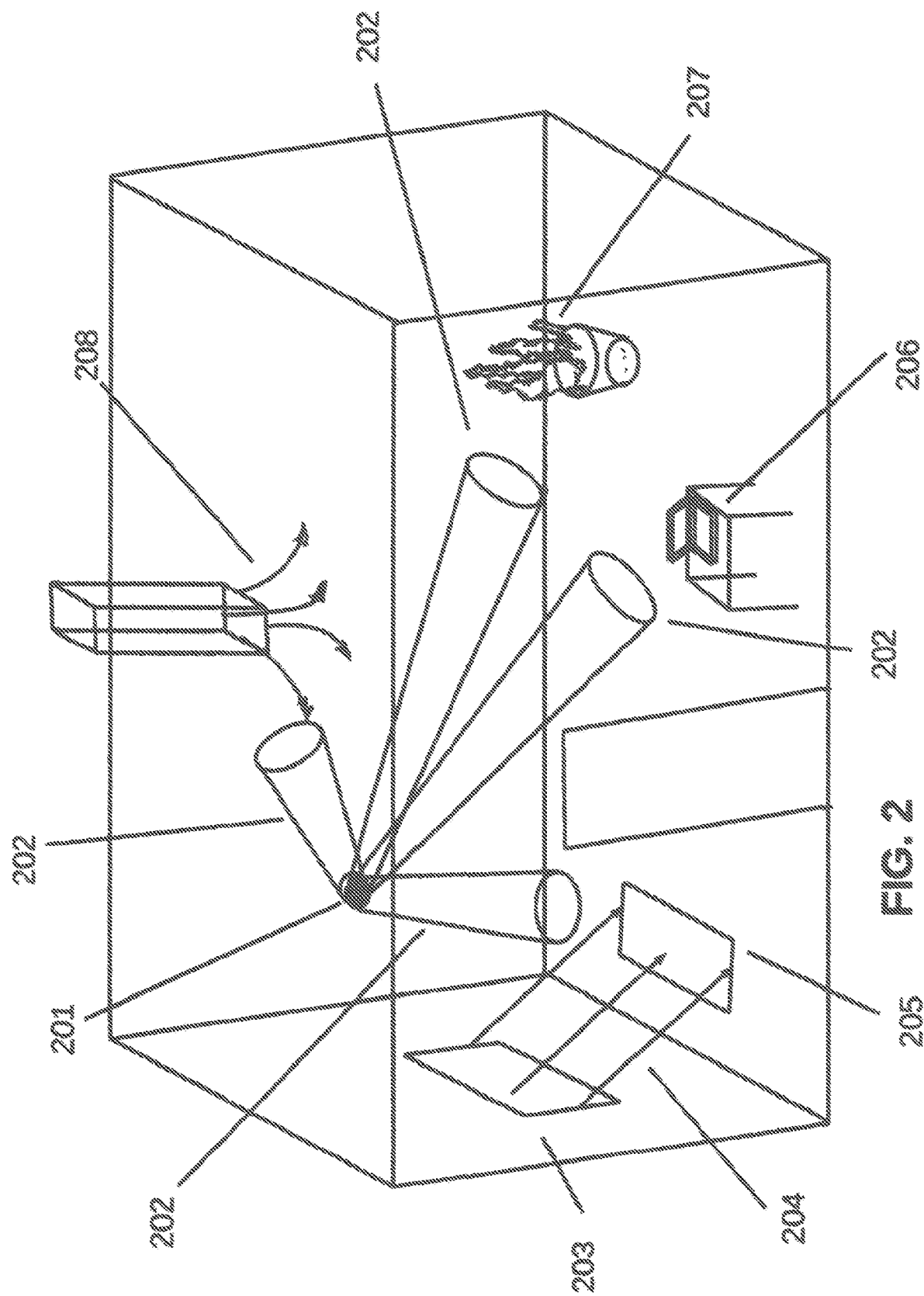
FIG. 2 is a perspective view of infrared radiation scanning of multiple spatial areas of interest in a room showing objects that involve heat transfer. Also shown is an entry location for conditioned fluid flow.

Now referring to FIG. 2 which discloses a location of a multi-pixel, multi-spectral infrared radiation sensor referenced by numeral 201 positioned on a wall to measure infrared radiation in one or more spatial areas. The infrared radiation sensor is directed to scan spatial areas to measure thermal properties of objects and heat transfer between objects. Examples of objects and areas that generate thermal radiation within a spatial area are referenced by numerals 205, 206, 207 and 208. Specifically, solar radiation referenced by numeral 204 passes through a window reference by numeral 203 and heats the floor area referenced by numeral 205. Similarly, electronic equipment referenced by numeral 206, (for example, a computer) creates heat. An accidental fire referenced by numeral 207 generates heat that is rapidly detected so action can be taken. Conditioned fluid flow referenced by numeral 208 flows into the room that contributes to heat transfer within the spatial areas. Depending on external ambient conditions outside the window referenced by numeral 203, the thermal properties of the window can contribute to heat transfer in the spatial area. The focused fields of view referenced by numeral 202 of the infrared radiation sensor referenced by numeral 201 detects the thermal properties of critical objects and areas and heat transfer created by the heated objects and areas for processing. Alternately, the multi-pixel, multi-spectral infrared radiation sensor can be selected and configured to scan the entire room as a spatial area.

Figure 3:
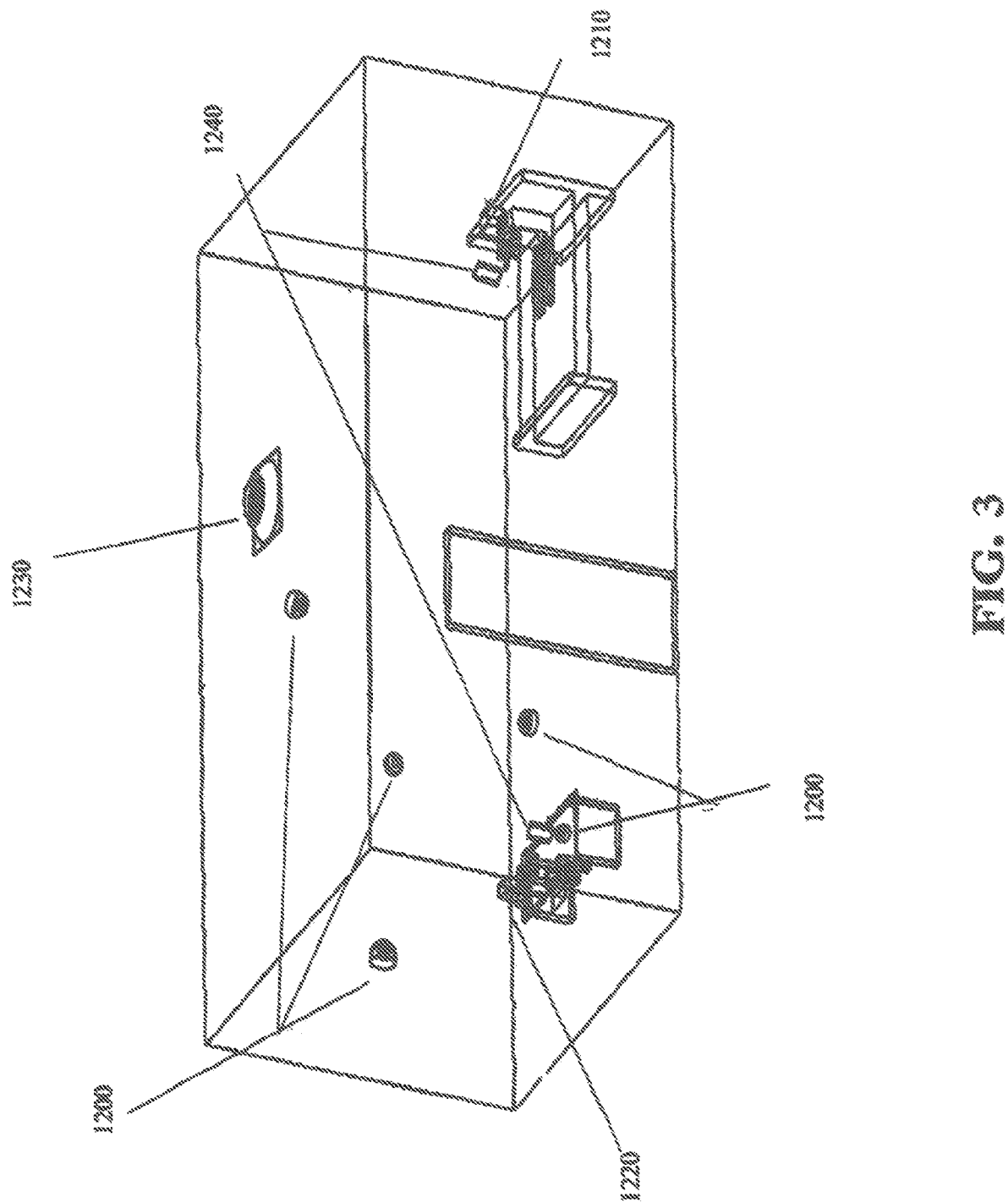
FIG. 3 is a perspective view of a spatial area in a room showing locations for infrared radiation scanning and locations of two way communication devices to program to operation of the electronic control unit and for feedback response to the control and analysis algorithm in the electronic control unit.

Now referring to FIG. 3 which discloses the infrared radiation sensor referenced by numeral 1200 which is depicted in a number of locations within a room or office, wherein the infrared radiation sensor has the functionality of the following: it can sense infrared radiation from objects within the spatial area, and can control the movement of conditioned fluid flow to modify thermal conditions based on feedback from a user located at optional locations referenced by numerals 1210 and 1220. The infrared radiation sensor could also incorporate sensing visible light from objects in the spatial area, and sensing distance between objects in the spatial area to supplement heat transfer calculations. Conditioned fluid flows from a location referenced by numeral 1230 and is directed to the spatial area and controlled by feedback from a device referenced by numeral 1240.

Figure 4:
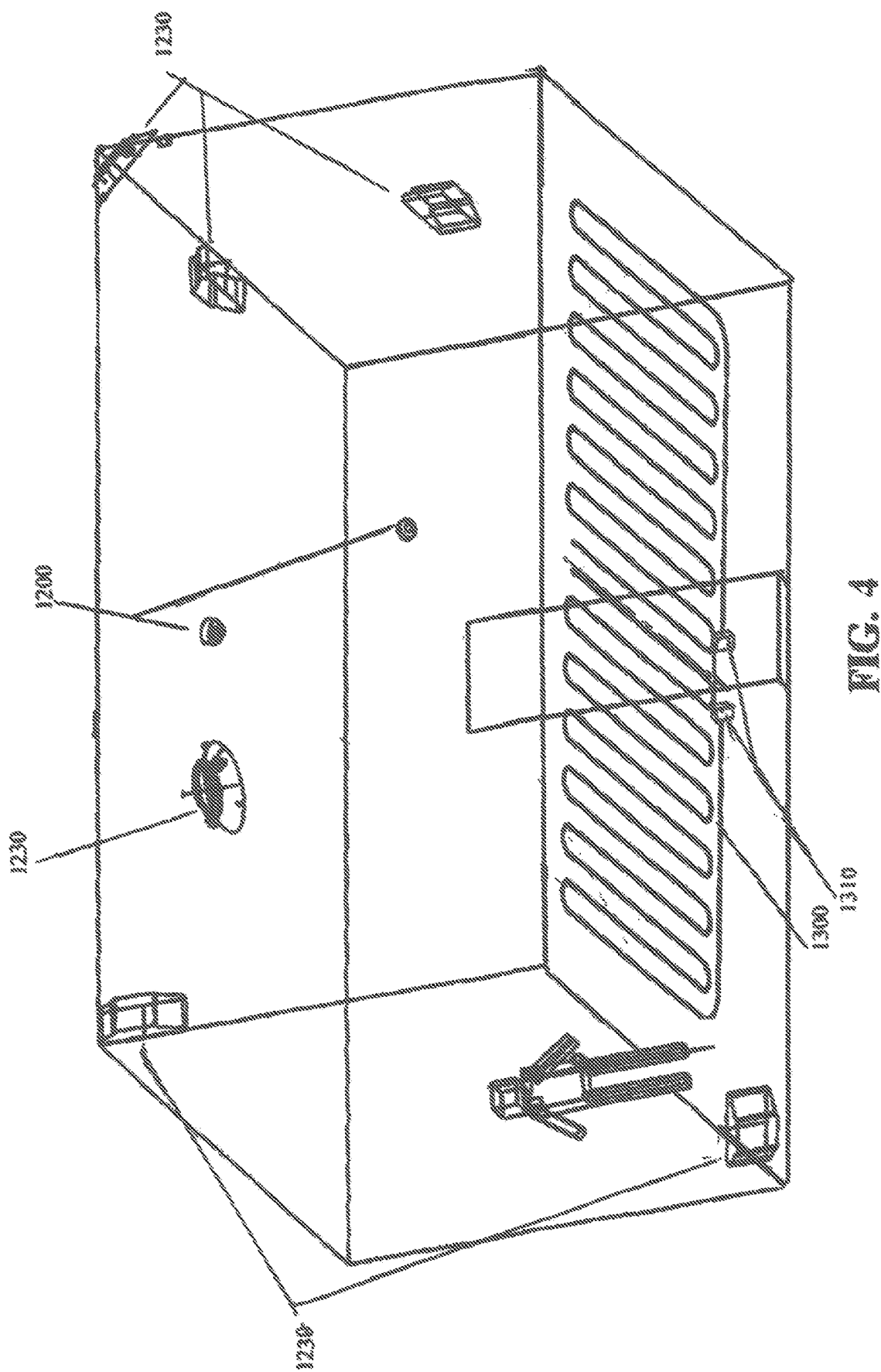
FIG. 4 is a perspective view of a spatial area of interest in a room showing possible locations for entry of conditioned fluid flow into the spatial area and locations for infrared radiation scanning.

Now referring to FIG. 4 which discloses optional locations for the infrared radiation sensors in the ceiling and back wall referenced by numeral 1200, and optional locations for the entry of the conditioned fluid flow into the spatial area referenced by numeral 1230. Also disclosed is a location for conditioned liquid flow in a hydronic heating/cooling system referenced by numeral 1300 and a regulator to modulate the conditioned fluid flow referenced by numeral 1310.

Figure 5:
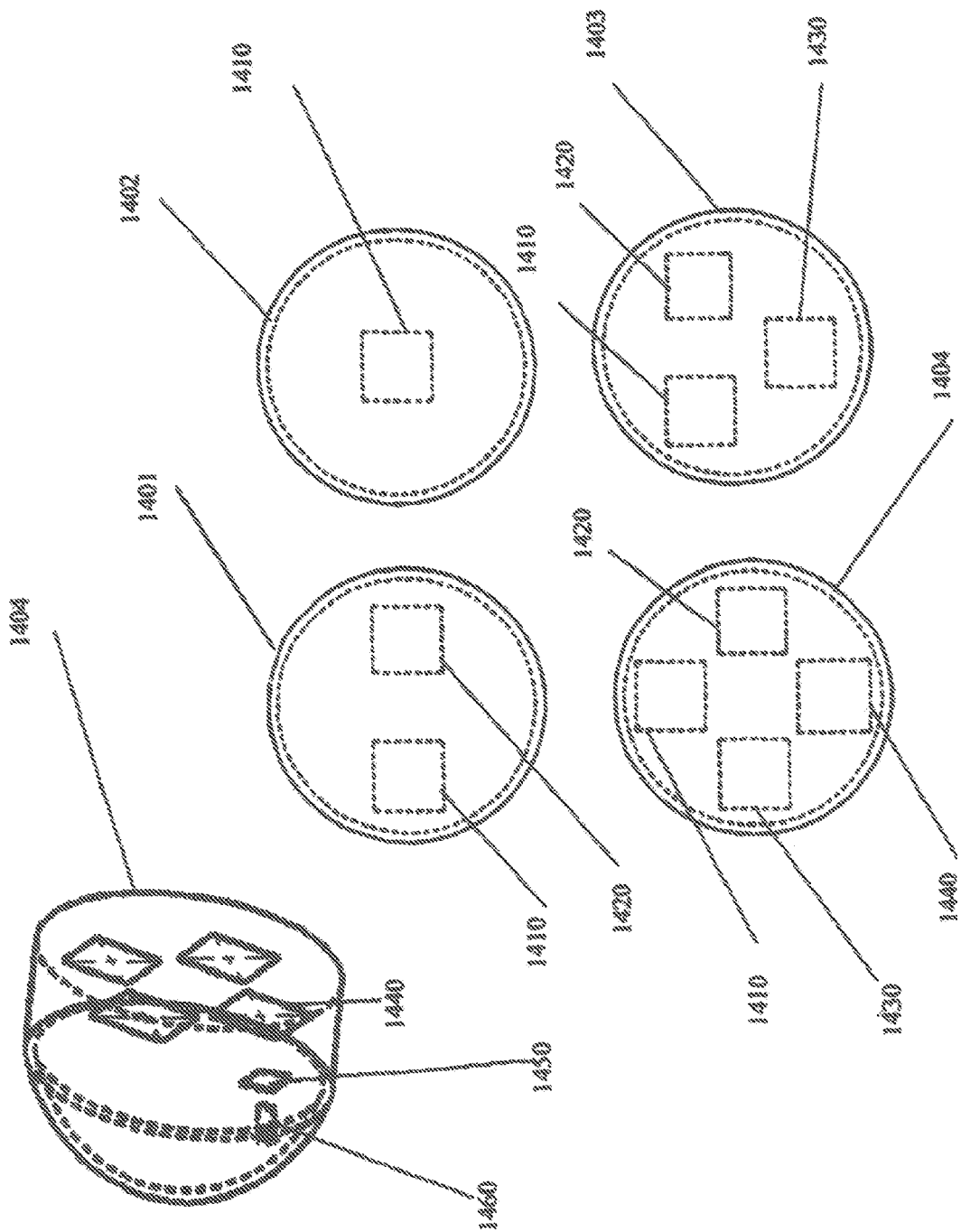
FIG. 5 is a view of the sensor structure options enabling infrared radiation scanning and visible light scanning.

Now referring to FIG. 5 which discloses the options for the structure of the infrared radiation sensor with one detector army referenced by numeral 1402 having the function of infrared radiation detection; a infrared radiation sensor with structure referenced by numeral 1401 that has two detectors reference by numerals 1410 and 1420 wherein at a minimum one detector is an infrared radiation detector; an infrared radiation sensor with a structure referenced by numeral 1403 that has three detectors referenced by numeral 1410, 1420 and 1430 wherein at a minimum one detector is an infrared radiation detector; and an infrared radiation sensor with a structure referenced by numeral 1404 that has four detectors referenced by numeral 1410, 1420, 1430, and 1440 wherein at a minimum one detector is a radiance detector. Within sensor referenced by numeral 1402, the detector referenced by numeral 1410 has the function of infrared radiation detection or a combination of infrared radiation detection plus visible light detection. Within sensor referenced by numeral 1401, the detector referenced by numeral 1410 has the function of infrared radiation detection and detector referenced by numeral 1420 that is a second infrared radiation sensor (allowing 3D infrared radiation detection) or a visible light sensor. Within sensor referenced by numeral 1403, the detector referenced by numeral 1410 has the function of infrared radiation detection and detector referenced by numeral 1420 that is a second infrared radiation sensor (allowing 3D infrared radiation detection) or a visible light sensor, and a detector referenced by numeral 1430 that is a second or third infrared radiation sensor (allowing 3D infrared radiation detection) or a first or second visible light sensor (allowing 3D visible light sensing). Within sensor referenced by numeral 1404, the detector referenced by numeral 1410 has the function of infrared radiation detection and detector referenced by numeral 1420 that is a second infrared radiation sensor (allowing 3D infrared radiation detection) or a visible light sensor, and detector referenced by numeral 1430 that is a second infrared radiation sensor (allowing 3D infrared radiation detection) or a first or second visible light sensor (allowing 3D visible light sensing) and infrared radiation sensor or visible light sensor referenced by numeral 1440 has any combination of functions of 2D or 3D infrared radiation detection, and 2D or 3D visible light detection or CO2 detection. The perspective view of sensor structure option referenced by numeral 1404 shows the addition of components for CO2 concentration detection utilizing an infrared emitter referenced by numeral 1460 and a CO2 radiation filter referenced by numeral 1450 and an infrared radiation sensor referenced by numeral 1440 configured for CO2 concentration detection.

Figure 6:
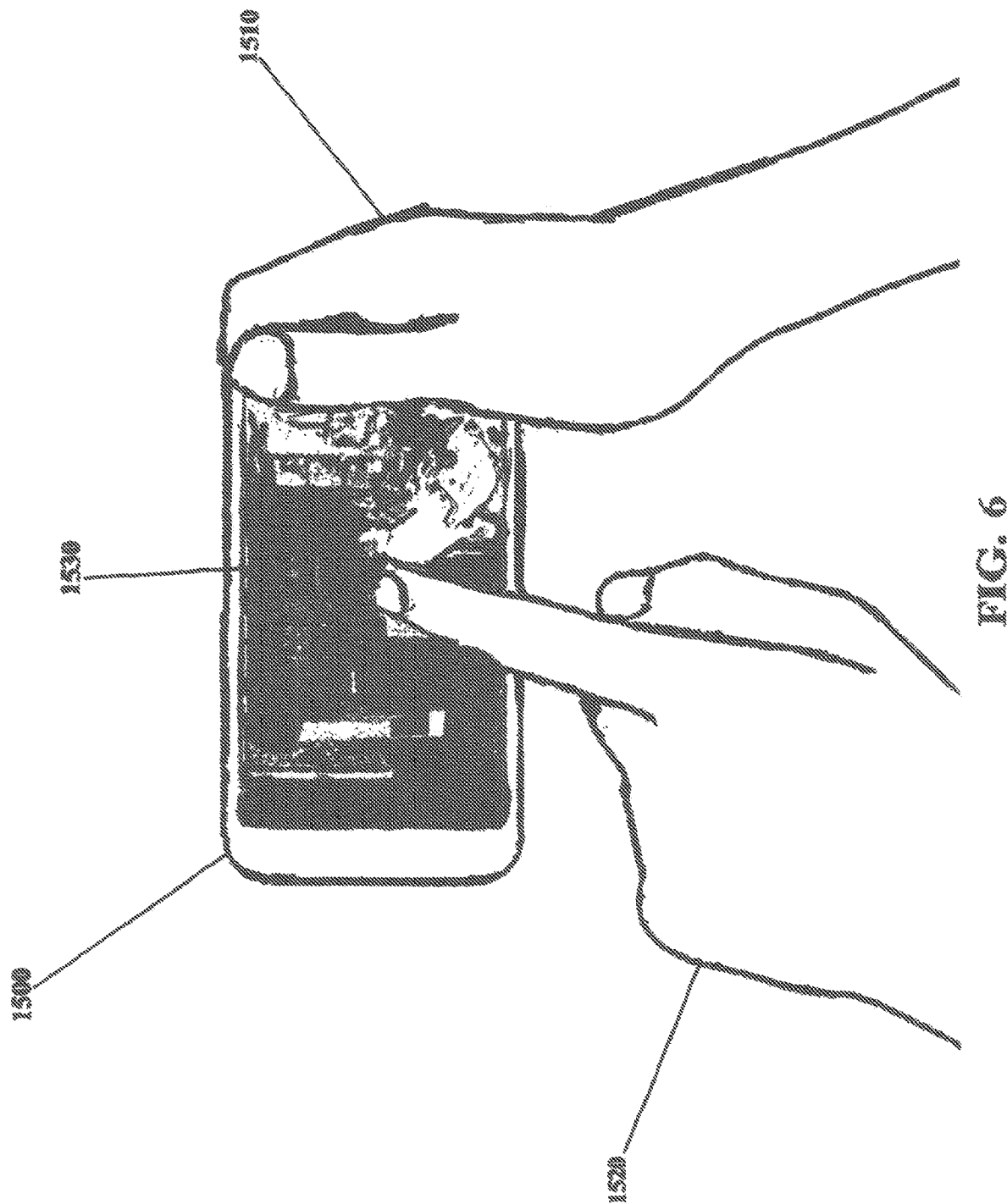
FIG. 6 is a simulated view of a scanned infrared radiation image and visible light image available for visual analysis and control on a hand-held device with a display.

Now referring to FIG. 6 which discloses the infrared radiation image of a user working at a desk reference by numeral 1530 displayed on a hand held user input device referenced by numeral 1500. The user hand referenced by numeral 1520 is shown selecting the focus within the area of detection for control with the other user hand referenced by numeral 1510 holding the user input device.

Figure 7:
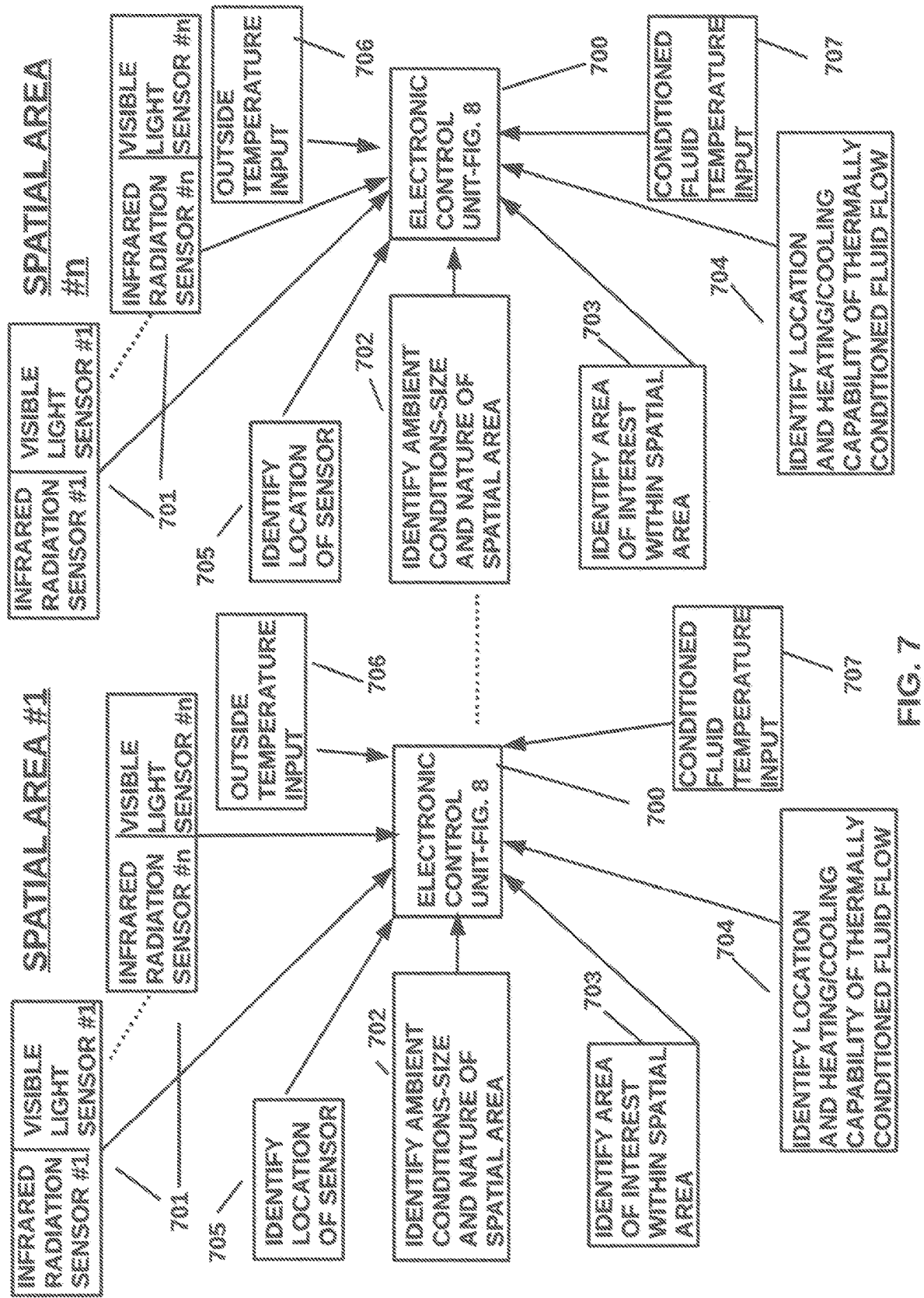
FIG. 7 is a block drawing for the electronic control unit with sensor data inputs, spatial area data inputs and conditioned fluid flow detail inputs.

Now referring to FIG. 7 which discloses a block drawing for the method of data input for processing by the electronic control unit referenced by numeral 700. The infrared radiation sensor referenced by numeral 701 maps thermal infrared radiation of objects in the spatial area of interest and communicates the infrared radiation data to the electronic control unit referenced by numeral 700. Optional, a visible light sensing capability referenced also by numeral 701, either integrated with the infrared radiation sensor or as a separate pixel array, communicates visible light data of the spatial area of interest for enhanced visual analysis of the thermal properties. Data identifying the ambient conditions external to or internal to the spatial area (for example, exterior wall insulation, windows, doors, ceiling, floors, latitude and longitude of the spatial area) is communicated to the electronic control unit in the process step referenced by numeral 702. Information related to the specific location of the spatial area of interest is communicated to the electronic control unit referenced by numeral 700 in the process step referenced by numeral 703. Data identifying the location and heating/cooling capability of the thermally conditioned fluid flow is communicated to the electronic control unit in the process step referenced by numeral 704. The location of the infrared radiation sensor and visible light sensor (if incorporated) referenced by numeral 701 (for example, wall or ceiling or floor) is communicated to the electronic control unit referenced by numeral 704. Outside air temperature measuring capability is communicated to the electronic control unit by process step referenced by numeral 706. Conditioned fluid temperature measuring capability is communicated to the electronic control unit by process step referenced by numeral 707. FIG. 7 schematic further allows that the entire enclosed area can be scanned for mapping with thermal imaging and visible light imaging using one of more infrared radiation sensors referenced by numeral 701 and one or more electronic control units referenced by numeral 701.

Figure 8:
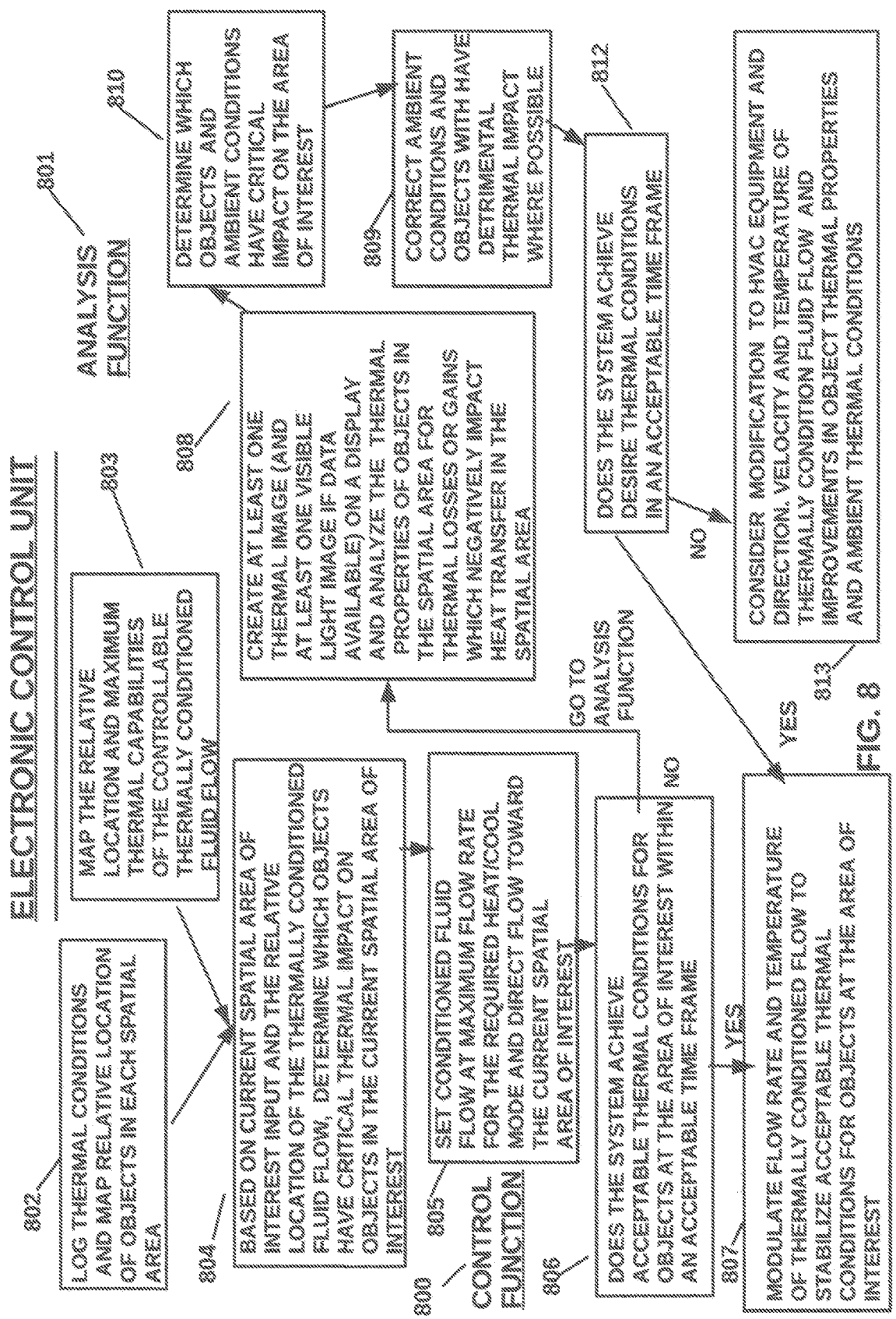
FIG. 8 is a block drawing detailing the basic steps of the algorithm in the electronic control unit to process the sensor data inputs, spatial area data inputs and conditioned fluid flow details.

Now referring to FIG. 8 which discloses the logic within the electronic control unit (FIG. 7) within the method process for analyzing and controlling thermal conditions within a spatial area of interest. The first step reference by numeral 802 to apply the proposed "METHOD FOR ENVIRONMENTAL ANALYSIS AND CONTROL OF SPATIAL AREAS" is to process the infrared radiation/visible light sensor data inputs and other supplemental data inputs as shown in FIG. 7 referenced by numerals 701, 702, 703, 704 and 705 for logging thermal conditions and mapping relative location of objects in each spatial area. The next step referenced by numeral 803 in the method process is to map the relative location and maximum thermal capabilities of the controllable thermally conditioned fluid. The next step referenced by numeral 804, based on the current spatial are of interest and the relative location of the thermally conditioned fluid flow, is to determine which objects have a critical thermal impact on the current spatial area of interest. The next step referenced by numeral 805 is to determine whether the spatial area requires heating or cooling and set the thermally conditioned flow to the maximum flow and in the direction of the current spatial area of interest for the required thermal correction. The next step referenced by numeral 806 is to determine if the required thermal correction achieves acceptable thermal conditions for objects in the current spatial area of interest in an acceptable time frame. If acceptable thermal conditions for objects in the current area of interest is achieved, the next step referenced by numeral 807 is to modulate the flow rate of the thermally conditioned flow to stabilize acceptable thermal conditions of objects in the current spatial area of interest. If acceptable thermal conditions of objects in the current spatial area of interest is not achieve in an acceptable time frame, initiate analysis function of the method process referenced by numeral 801. The first step within the analysis function referenced by numeral 808 is to create at least one thermal image (and at least one visible light image if data available) on a display and analyze the thermal properties of objects within the current spatial area of interest for thermal losses or gains which negatively impact heat transfer in the current spatial area of interest. The next step referenced by numeral 810 in the method process is to determine which objects and ambient conditions have critical impact on the current spatial area of interest. The next step referenced by numeral 809 in the method process is to correct the ambient conditions and objects which have a detrimental impact on the current spatial area of interest, where possible. The next step, after correction in process step referenced by numeral 809, referenced by numeral 812 in the method process is to determine if the system currently achieves the desired thermal conditions for objects in the current spatial area of interest in an acceptable time frame with the conditioned fluid flow at maximum flow and directed at the current spatial area of interest for the required heat/cool mode. If the desired thermal conditions are achieved proceed to method process step referenced by numeral 807 and modulate the flow rate of the thermally conditioned flow-to stabilize acceptable thermal conditions for objects in the current spatial area of interest. If the system does not achieve desired thermal conditions in an acceptable time frame, consider modifications in the process step referenced by numeral 813:
a) modify the HVAC equipment for the thermally conditioned fluid flow, b) modify the ability to direct the thermally conditioned fluid flow in the direction of the current spatial area of interest, c) modify the temperature and velocity of the thermally conditioned fluid flow, d) incorporate control of the thermal properties of the objects in the spatial area and the effects of external ambient thermal conditions. The method for the analysis function to improve energy conservation in the current area of interest can be run independently by method process steps referenced by numerals 802, 803,808, 809, 810 and 813.

The invention claimed is:

1. A method of environmental analysis in one or more spatial areas for tracking movement of a thermally conditioned fluid, mapping thermal infrared radiation of a plurality of objects within said one or more spatial areas, and tracking dynamic heat transfer between said plurality of objects, comprising:
   utilizing a multi-pixel, multi-spectral infrared radiation sensor in recording at least two multi-pixel, multi-spectral infrared radiation images by scanning, said recording being in two or three dimensions, said images being of said plurality of objects in said one or more spatial areas, said images being communicated to an electronic control unit;
   a) documenting data of a physical location of said multi-pixel, multi-spectral infrared radiation sensor,
   b) identifying ambient conditions external to and internal within said one or more spatial areas, and communicating said ambient conditions to said electronic control unit,
   c) determining a location of said plurality of objects in said one or more special areas, and
   d) determining and processing the following by an algorithm by said electronic control unit:
      mapping a thermal load distribution in said one or more spatial areas, and
      mapping a dynamic transfer of heat in said one or more spatial areas.

2. The method of claim 1 whereby said algorithm is further configured for modulating said movement of said thermally conditioned fluid and for controlling
   a) said dynamic heat transfer between said plurality of objects and
   b) said thermal load distribution in said one or more spatial areas.

3. The method of claim 1 further incorporating scanning at least one or more visible light images of said plurality of objects in said one or more spatial areas in said two or three dimensions;
   wherein said algorithm uses said at least one or more visible light images for at least one of the following:
      a) integrating with said at least two multi-spectral, multi-pixel infrared radiation images and
      b) viewing separately said at least one or more visible light images for said visual analysis.

4. The method of claim 1 whereby said algorithm is further configured for said environmental analysis in said one or more spatial areas in said two or three dimensions for at least one of the following:
   a) detecting occupancy for security,
   b) detecting fire and smoke, and
   c) detecting $CO_2$ concentration.

* * * * *